United States Patent
Washihira et al.

(10) Patent No.: US 11,837,857 B2
(45) Date of Patent: Dec. 5, 2023

(54) ELECTRICAL JUNCTION BOX

(71) Applicants: SUMITOMO WIRING SYSTEMS, LTD., Mie-ken (JP); TOYOTA JIDOSHA KABUSHIKI KAISHA, Aichi-ken (JP)

(72) Inventors: Kenichi Washihira, Yokkaichi (JP); Takashi Shiraki, Yokkaichi (JP); Yuji Miyamoto, Yokkaichi (JP); Takanori Kawai, Miyoshi (JP); Takuma Kawai, Nagoya (JP)

(73) Assignees: SUMITOMO WIRING SYSTEMS, LTD., Mie-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 686 days.

(21) Appl. No.: 17/007,280

(22) Filed: Aug. 31, 2020

(65) Prior Publication Data

US 2021/0083463 A1    Mar. 18, 2021

(30) Foreign Application Priority Data

Sep. 17, 2019  (JP) .................................. 2019-168653

(51) Int. Cl.
*H02G 3/08* (2006.01)
*B60R 16/023* (2006.01)

(52) U.S. Cl.
CPC ......... *H02G 3/086* (2013.01); *B60R 16/0238* (2013.01)

(58) Field of Classification Search
CPC ........ H05K 5/0026; H02G 3/08; H02G 3/081; H02G 3/086; H02G 3/14; B60R 16/0238
See application file for complete search history.

(56) References Cited

U.S. PATENT DOCUMENTS

| | | | | |
|---|---|---|---|---|
| 5,574,254 A | * | 11/1996 | Mori ...................... | H02G 3/088 220/DIG. 14 |
| 6,545,217 B2 | * | 4/2003 | Sato ....................... | H02G 3/088 174/64 |
| 7,077,281 B2 | * | 7/2006 | Sato .......................... | H02G 3/10 220/806 |
| 8,072,758 B2 | * | 12/2011 | Groppo .............. | H05K 7/20927 361/689 |
| 8,785,775 B2 | * | 7/2014 | Takeuchi ............ | B60R 16/0239 174/67 |

(Continued)

FOREIGN PATENT DOCUMENTS

| | | |
|---|---|---|
| JP | 11-41748 | 2/1999 |
| JP | 2002-369335 | 12/2002 |

(Continued)

*Primary Examiner* — Thanh Tam T Le
(74) *Attorney, Agent, or Firm* — GREENBLUM & BERNSTEIN, P.L.C.

(57) ABSTRACT

A cover-side peripheral wall includes an inner wall, which serves as a first wall, and a bent wall. The inner wall is located between an inner wall and an outer wall of a body-side double-wall. The bent wall extends inward and downward from an inner surface of the inner wall. The bent wall has a proximal end that is located upward from an upper end of the inner wall of a body-side peripheral wall. The bent wall further includes a portion between a distal end and the proximal end that is located inward and downward from the upper end of the inner wall of the body-side peripheral wall.

7 Claims, 4 Drawing Sheets

(56) References Cited

U.S. PATENT DOCUMENTS

| | | | |
|---|---|---|---|
| 8,878,059 B2 | 11/2014 | Makino | |
| 8,915,394 B2* | 12/2014 | I | B60R 16/0239 |
| | | | 220/378 |
| 9,056,596 B2* | 6/2015 | Nagashima | H05K 5/04 |
| 9,099,850 B2* | 8/2015 | Kakimi | H01H 9/04 |
| 9,219,356 B2* | 12/2015 | I | H02G 3/081 |
| 9,431,806 B2* | 8/2016 | Ueyama | H05K 5/06 |
| 9,521,772 B2* | 12/2016 | Etlinger | H05K 5/068 |
| 9,819,168 B2* | 11/2017 | Shiraki | H02G 3/14 |
| 10,305,267 B2* | 5/2019 | Kawada | B60R 16/0238 |
| 10,559,948 B2* | 2/2020 | Ikeda | B60R 16/0207 |
| 11,329,465 B2* | 5/2022 | Kawamura | B60R 16/0215 |
| 2003/0000720 A1 | 1/2003 | Sato | |

FOREIGN PATENT DOCUMENTS

| | | |
|---|---|---|
| JP | 2010-200431 | 9/2010 |
| JP | 2013-034320 | 2/2013 |

\* cited by examiner

ELECTRICAL JUNCTION BOX

1. FIELD

The present disclosure relates to an electrical junction box.

2. DESCRIPTION OF RELATED ART

A conventional electric connector that is mounted on a vehicle accommodates electronic components such as relays and fuses (for example, refer to Japanese Laid-Open Patent Publication No. 2013-34320).

The electrical junction box of the above patent publication includes an upper cover arranged at the upper side of a case body. The upper cover and the case body each have a double-wall structure including an outer wall and an inner wall. In the structure, the outer wall of the case body is located at the inner side of the outer wall of the upper cover, the inner wall of the upper cover is located at the inner side of the outer wall of the case body, and the inner wall of the case body is located at the inner side of the inner wall of the upper cover. This protects the electronic components accommodated in the electrical junction box from water.

In an electrical junction box such as that described above, the case body has the double-wall structure, and the inner wall of the upper cover is located between the outer wall and the inner wall of the case body. For example, when water enters the gap between the outer wall of the case body and the inner wall of the upper cover, the inner wall of the case body stops the entry of water. However, water may still enter the gap between the inner wall of the case body and the inner wall of the upper cover.

SUMMARY

It is an object of the present invention is to provide an electrical junction box that prevents water from reaching the electronic components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electrical junction box includes a case body and an upper cover. The case body accommodates an electronic component. The case body includes a body-side peripheral wall and an upper opening. The body-side peripheral wall has a closed form. The upper opening is located at an upper side of the body-side peripheral wall and covered by the upper cover. The upper cover includes a cover-side peripheral wall that has a closed form and is arranged on the body-side peripheral wall. The body-side peripheral wall has a body-side double-wall including an inner wall and an outer wall. The cover-side peripheral wall includes a first wall and a bent wall. The first wall is located between the inner wall and the outer wall of the body-side double-wall and includes an inner surface. The bent wall extends inward and downward from the inner surface of the first wall. The bent wall includes a proximal end and a distal end. The proximal end is located upward from an upper end of the inner wall of the body-side peripheral wall. The bent wall includes a portion between the distal end and the proximal end that is located inward and downward from the upper end of the inner wall of the body-side peripheral wall.

With the above configuration, the bent wall includes a portion between the proximal end and the distal end that is located inward and downward from the upper end of the inner wall of the body-side peripheral wall. Thus, even when water enters the gap between the inner wall of the body-side peripheral wall and the first wall of the cover-side peripheral wall, the water is guided downward to protect the electronic components from the water.

In another general aspect, it is preferred that a drain passage be located downward from the bent wall. Preferably, the drain passage is defined by walls, and an inner one of which includes an upper end that is located downward from the bent wall.

With the above configuration, the drain passage is located downward from the bent wall. Further, among the walls of the drain passage, the inner wall includes the upper end that is located downward from the bent wall. Thus, the water entering the drain passage will not be drawn upward by capillary action or the like. This protects the electronic components from water. Also, the drain passage located downward from the bent wall drains out water.

In a further general aspect, it is preferred that the drain passage located downward from the bent wall serve as a first drain passage, and a second drain passage be located downward from the first wall.

With the above configuration, in addition to the first drain passage, the second drain passage is located downward from the first wall. Thus, the second drain passage, which is located downward from the first wall, drains water first. Then, the first drain passage drains the water that reaches the bent wall.

In a further general aspect, it is preferred that the first drain passage and the second drain passage be separate passages configured to drain water.

With the above configuration, the first drain passage is separate from the second drain passage. Thus, for example, even if water overflows one of the passages, water will be drained by the other one of the passages. This protects the electronic components from water.

In a further general aspect, it is preferred that the second drain passage be located at an outer side of the first drain passage.

With the above configuration, the second drain passage is located at the outer side of the first drain passage. Thus, the second drain passage drains water and reduces the effects of water flowing to the interior. This protects the electronic components from water.

In a further general aspect, it is preferred that the cover-side peripheral wall further include a second wall that is located outward from the first wall. Preferably, the second wall and the first wall are arranged at two sides of the outer wall of the body-side double-wall.

With the above configuration, the cover-side peripheral wall further includes the second wall located outward from the first wall. Further, the second wall and the first wall are located at two sides of the outer wall of the body-side double-wall. That is, the first wall and the second wall form the double-wall. The upper cover is located upward from the case body. The second wall of the upper cover, which is located upward from the case body, is located outward from the outer wall of the case body. This obviates the entry of water into the gap between the second wall and the outer wall.

In a further general aspect, it is preferred that the distal end of the bent wall be located inward and downward from the upper end of the inner wall of the body-side peripheral wall.

With the above configuration, the distal end of the bent wall is located inward and downward from the upper end of the inner wall of the body-side peripheral wall. Thus, even if water enters the gap between the inner wall of the body-side peripheral wall and the first wall of the cover-side peripheral wall, the bent wall guides the water downward and protects the electronic components from water.

In a further general aspect, it is preferred that the bent wall be arranged on part of the cover-side peripheral wall.

With the above configuration, the bent wall is arranged on part of the cover-side peripheral wall. Here, when the electrical junction box is mounted on the vehicle, the electrical junction box may be located adjacent to the vehicle body, a component, or the like. The placement of the electrical junction box will determine the parts of the electrical junction box that are prone to getting wet. Accordingly, the bent wall is arranged on the cover-side peripheral wall only at parts corresponding to the parts of the electrical junction box prone to getting wet. This protects the electronic components from water without arranging the bent wall along the entire cover-side peripheral wall.

The electrical junction box of the present disclosure protects the electronic components from water.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of an electrical junction box will now be described.

Figure 1:
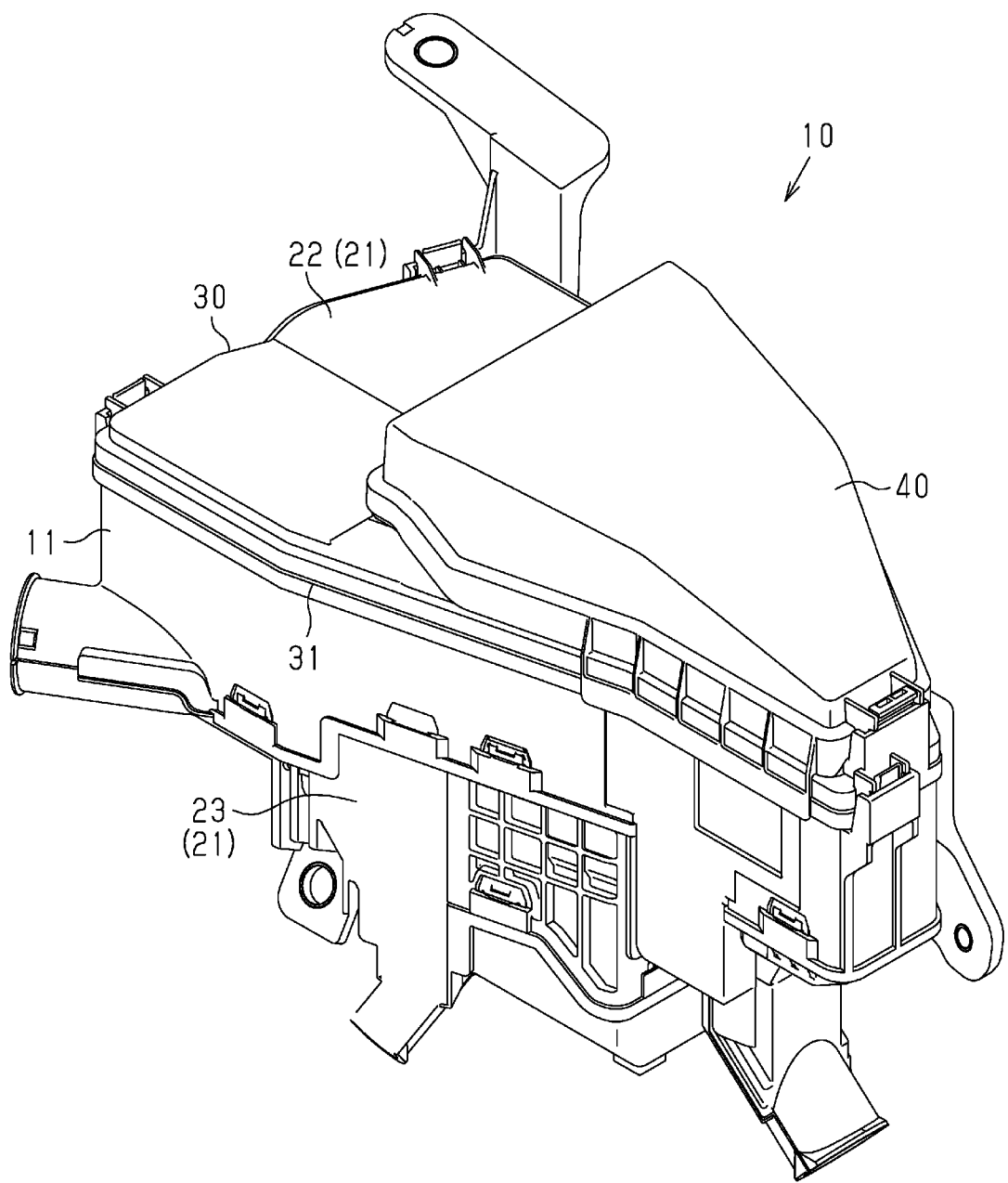
FIG. 1 is a perspective view showing an electrical junction box of one embodiment.

As shown in FIG. 1, an electrical junction box 10 includes a case body 11 and a cover 21 coupled to the case body 11.

The electrical junction box 10 is, for example, installed in an engine compartment of a vehicle. Here, the term "engine compartment" is used as a generic term for a compartment that accommodates a drive source and the like of the vehicle. The drive source includes an engine, a motor, and the like. In the description hereafter, the vertical direction in a state in which the electrical junction box 10 is installed in the engine compartment of the vehicle is referred to as the upward and downward directions.

Figure 2:
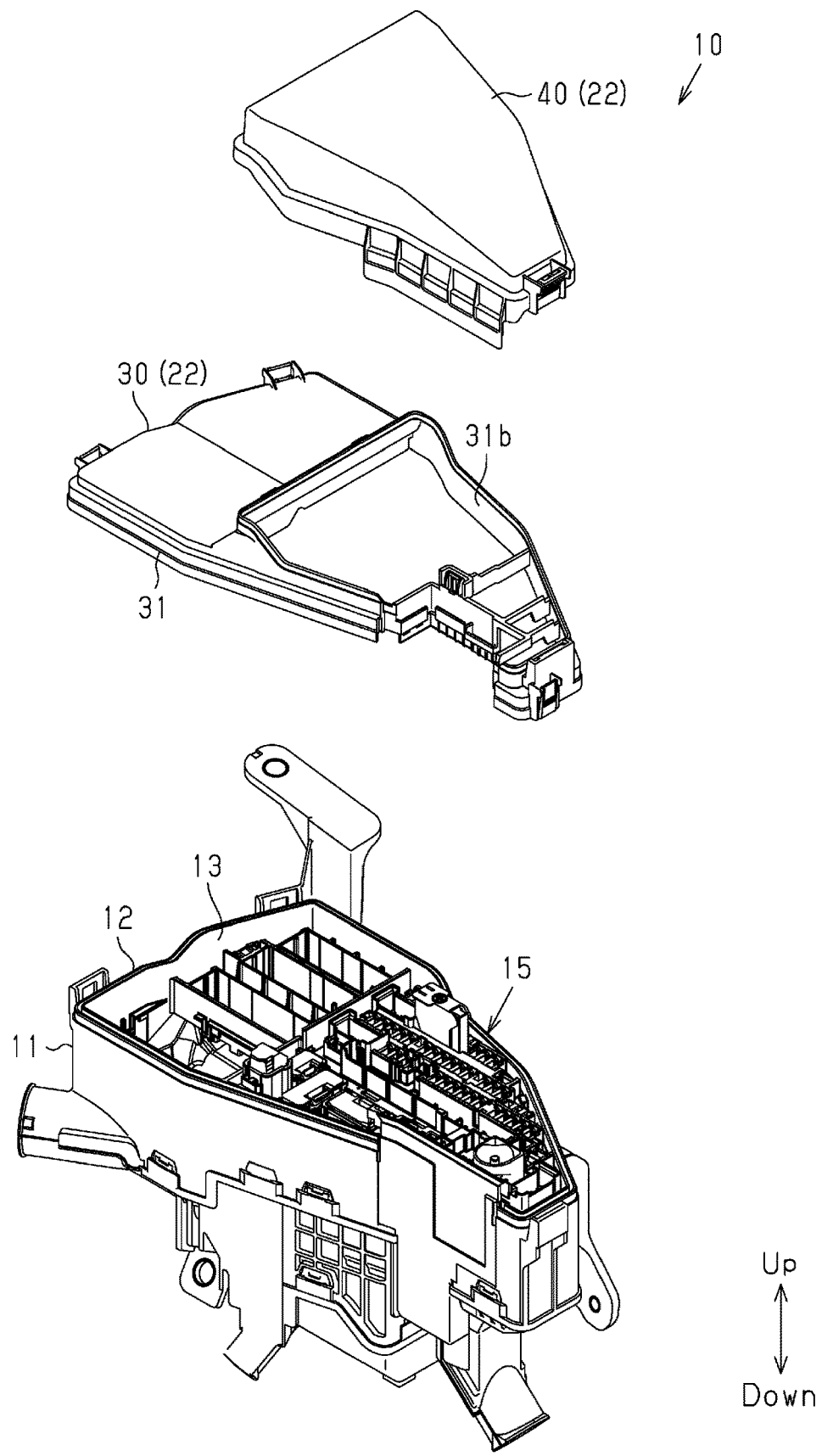
FIG. 2 is an exploded perspective view showing the electrical junction box of the embodiment.

As shown in FIG. 2, the case body 11 has a substantially closed form and includes a body-side peripheral wall 12. The case body 11 includes an opening 13 at upper and lower sides of the body-side peripheral wall 12 (only upper side is shown).

Figure 3:
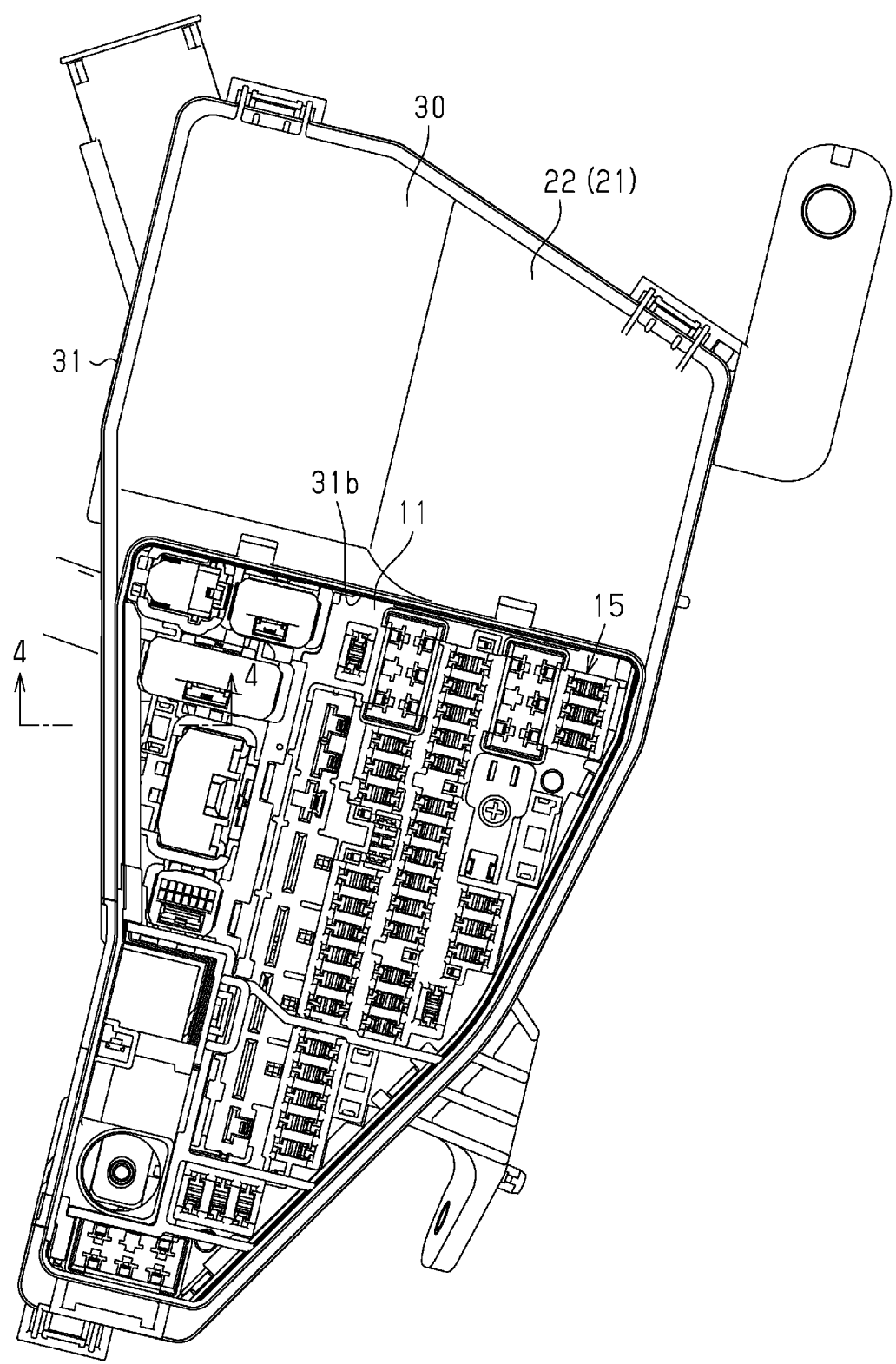
FIG. 3 is a plan view showing the electrical junction box of the embodiment.

As shown in FIGS. 2 and 3, the case body 11 includes a holding portion 15 that holds electronic components such as relays and fuses.

Figure 4:
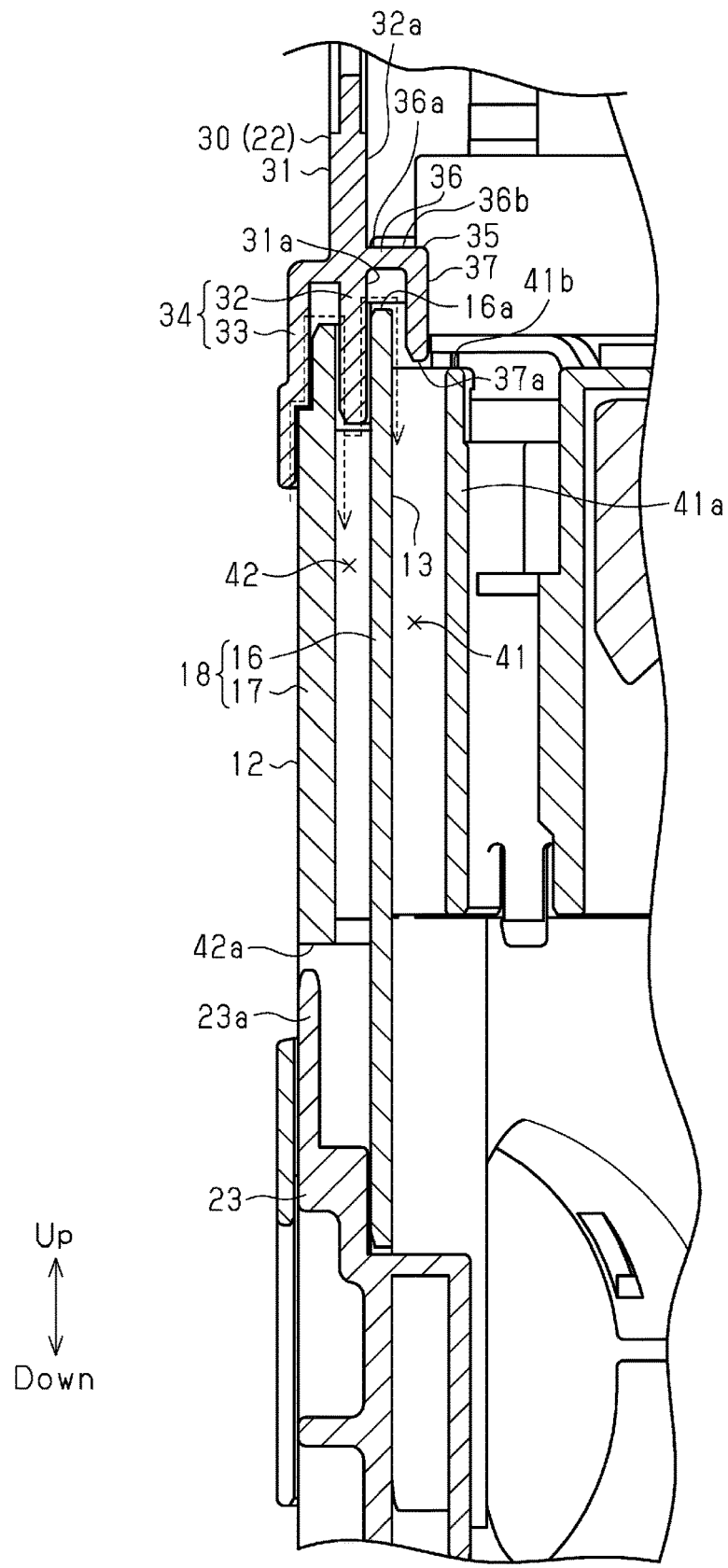
FIG. 4 is a cross-sectional view taken along line 4-4 in FIG. 3.

As shown in FIG. 4, the body-side peripheral wall 12 includes a body-side double-wall 18 at the side of the upper opening 13. The body-side double-wall 18 includes an inner wall 16 and an outer wall 17. The body-side double-wall 18 extends along substantially the entire periphery of the body-side peripheral wall 12. The inner wall 16 is located inward from the outer wall 17 and spaced apart from the outer wall 17 by a substantially constant distance.

As shown in FIGS. 1 and 2, the cover 21 includes an upper cover 22 and a lower cover 23. In a state in which the electrical junction box 10 is installed in the engine compartment, the upper cover 22 is coupled to the upper side of the case body 11. In a state in which the electrical junction box 10 is installed in the engine compartment, the lower cover 23 is coupled to the lower side of the case body 11.

The upper cover 22 includes a first upper cover portion 30 and a second upper cover portion 40.

As shown in FIGS. 1, 2, and 4, a cover-side peripheral wall 31 has a closed form and is arranged on the body-side peripheral wall 12.

As shown in FIG. 4, the lower side of the cover-side peripheral wall 31, that is, the side of the cover-side peripheral wall 31 located closer to the body-side peripheral wall 12, includes an opening 31a. The opening 31a has substantially the same size as the opening 13 of the body-side peripheral wall 12.

As shown in FIG. 2, the upper side of the cover-side peripheral wall 31, that is, the side opposite to the opening 31a, includes an opening 31b. The opening 31b has a smaller area than the opening 31a.

Further, the cover-side peripheral wall 31 includes a cover-side double-wall 34 at the side of the lower opening 31a. The cover-side double-wall 34 includes an inner wall 32 and an outer wall 33. The cover-side double-wall 34 extends along substantially the entire periphery of the cover-side peripheral wall 31. The inner wall 32 is located inward from the outer wall 33 and spaced apart from the outer wall 33 by a substantially constant distance.

In a state in which the first upper cover portion 30 is coupled to the case body 11, the cover-side double-wall 34 is configured so that the outer wall 33 is located outward from the outer wall 17 of the body-side peripheral wall 12, and the inner wall 32 is located between the inner wall 16 and the outer wall 17 of the body-side peripheral wall 12.

As shown in FIG. 4, the inner wall 32 of the cover-side peripheral wall 31 includes a bent wall 35.

The bent wall 35 includes a first extension section 36 and a second extension section 37. The first extension section 36 extends from an inner surface 32a of the inner wall 32 in a direction substantially orthogonal to the inner surface 32a. The first extension section 36 includes a distal end 36b from which the second extension section 37 extends downward. In other words, the first extension section 36 and the second extension section 37 are substantially orthogonal to each other at the distal end 36b so that the bent wall 35 has a substantially L-shaped cross section.

The first extension section 36 includes a proximal end 36a, which is also the proximal end of the bent wall 35. In a state in which the first upper cover portion 30 is coupled to the case body 11, the proximal end 36a of the first extension section 36 is located upward from an upper end 16a of the inner wall 16 of the case body 11.

The second extension section 37 includes a distal end 37a, which is also the distal end of the bent wall 35. In a state in which the first upper cover portion 30 is coupled to the case body 11, the distal end 37a of the second extension section 37 is located inward and downward from the upper end 16a of the inner wall 16 of the case body 11.

The bent wall 35 is arranged on part of the cover-side peripheral wall 31. That is, the bent wall 35 does not extend along the entire cover-side peripheral wall 31. Here, when the electrical junction box 10 is mounted on the vehicle, the electrical junction box 10 may be located adjacent to the vehicle body, a component, or the like. The placement of the electrical junction box 10 will determine the parts of the electrical junction box 10 that are prone to getting wet. Thus, the bent wall 35 is arranged on the cover-side peripheral wall 31 only at parts corresponding to the parts of the electrical junction box 10 prone to getting wet. This protects the electronic components from water efficiently.

As shown in FIGS. 1 and 2, the second upper cover portion 40 is coupled to the upper side of the first upper cover portion 30. The second upper cover portion 40 closes the upper opening 31b of the first upper cover portion 30.

As shown in FIG. 3, in a state in which the second upper cover portion 40 is removed from the first upper cover portion 30, the electrical junction box 10 of the present embodiment is configured so that the holding portion 15 holding the electronic components is exposed to the outside.

As shown in FIG. 4, the electrical junction box 10 of the present embodiment includes a first drain passage 41 located downward from the bent wall 35.

The first drain passage 41 is defined by the inner wall 16 of the body-side double-wall 18 of the body-side peripheral wall 12 and a wall 41a. The wall 41a is located further inward from the inner wall 16 at a location separated from the inner wall 16. The wall 41a includes an upper end 41b located downward from the distal end 37a, which is the lower end of the bent wall 35. Thus, there is no wall or the like located inward from the bent wall 35.

As shown in FIG. 4, the electrical junction box 10 of the present embodiment includes a second drain passage 42 located downward from the inner wall 32.

The second drain passage 42 is defined by the inner wall 16 and the outer wall 17. Thus, the inner wall 16 serves to define both of the first drain passage 41 and the second drain passage 42. The second drain passage 42 is located outward from the first drain passage 41 and drains water separately from the first drain passage 41. More specifically, the inner wall 16, which defines both of the first drain passage 41 and the second drain passage 42, extends to the lower cover 23 and separates the first drain passage 41 and the second drain passage 42. Thus, the first drain passage 41 and the second drain passage 42 are separate passages for draining water. An engagement slit 42a is formed in the second drain passage 42, and the lower cover 23 includes a hook 23a. The hook 23a is snap-fitted to and engaged with the engagement slit 42a. The engagement slit 42a is one example of an outlet of the second drain passage 42.

The operation of the present embodiment will now be described.

In the electrical junction box 10 of the present embodiment, the bent wall 35 is arranged on the first upper cover portion 30.

When water enters the electrical junction box 10, the water will enter the electrical junction box 10, from, for example, the part where the first upper cover portion 30 is coupled to the case body 11. More specifically, when water enters the electrical junction box 10, water may enter the gap between the outer walls 17 and 33 as indicated by broken lines in FIG. 4. Most of the water entering the gap between the outer walls 17 and 33 will fall down between the outer wall 17 of the case body 11 and the inner wall 32 of the first upper cover portion 30 and be drained out of the electrical junction box 10. Further, for example, when the amount of water entering the gap between the outer wall 17 of the case body 11 and the inner wall 32 of the first upper cover portion 30 exceeds the amount that can be held in the void (space) between the outer wall 17 of the case body 11 and the inner wall 32 of the first upper cover portion 30, the water will enter the gap between the inner wall 32 of the first upper cover portion 30 and the inner wall 16 of the case body 11. In the electrical junction box 10 of the present embodiment, the water between the first upper cover portion 30 and the case body 11 that enters the gap between the inner walls 16 and 32 is guided downward by the bent wall 35. The water guided by the bent wall 35 is drained out of the electrical junction box 10 from the lower side of the case body 11 or the lower side of the lower cover 23.

The advantages of the present embodiment will now be described.

(1) The bent wall 35 includes a portion between the proximal end 36a and the distal end 37a that is located inward and downward from the upper end 16a of the inner wall 16 of the body-side peripheral wall 12. Thus, even when water enters the gap between the inner wall 16 of the body-side peripheral wall 12 and the inner wall 32 of the cover-side peripheral wall 31, the water is guided downward by the bent wall 35 to protect the electronic components from the water.

(2) The first drain passage 41 is located downward from the bent wall 35. Further, among the walls of the first drain passage 41, the inner wall, or the wall 41a, includes the upper end 41b that is located downward from the bent wall 35. Thus, the water entering the first drain passage 41 will not be drawn upward by capillary action or the like. This protects the electronic components from water. Also, the first drain passage 41 located downward from the bent wall 35 drains out water.

(3) In addition to the first drain passage 41, the second drain passage 42 is located downward from the inner wall 32. Thus, the second drain passage 42, which is located downward from the inner wall 32, drains water first. Then, the first drain passage 41 drains the water that reaches the bent wall 35.

(4) The first drain passage 41 is separate from the second drain passage 42. Thus, for example, even if water overflows one of the passages, water will be drained by the other one of the passages. This protects the electronic components from water.

(5) The second drain passage 42 is located at the outer side of the first drain passage 41. Thus, the second drain passage 42 drains water and reduces the effects of water flowing to the interior. This protects the electronic components from water.

(6) The cover-side peripheral wall 31 further includes the outer wall 33 that serves as a second wall. The outer wall 33 is located outward from the inner wall 32, which serves as a first wall. The outer wall 33 and the inner wall 32 are located at two sides of the outer wall 17 of the body-side double-wall 18. That is, the inner wall 32 and the outer wall 33 form the cover-side double-wall 34. The upper cover 22 is located upward from the case body 11. The outer wall 33 of the upper cover 22, which is located upward from the case body 11, is located outward from the outer wall 17 of the case body 11. This obviates the entry of water into the gap between the outer wall 17 and the outer wall 33.

(7) The distal end 37a of the bent wall 35 is located inward and downward from the upper end 16a of the inner wall 16 of the body-side peripheral wall 12. Thus, even if water enters the gap between the inner wall 16 of the body-side peripheral wall 12 and the inner wall 32 of the cover-side peripheral wall 31, the bent wall 35 guides the water downward and protects the electronic components from water.

(8) The bent wall 35 is arranged on part of the cover-side peripheral wall 31. Here, when the electrical junction box 10 is mounted on the vehicle, the electrical junction box 10 may be located adjacent to the vehicle body, a component, or the like. The placement of the electrical junction box 10 will determine the parts of the electrical junction box 10 that are prone to getting wet. Accordingly, the bent wall 35 is arranged on the cover-side peripheral wall 31 only at parts corresponding to the parts of the electrical junction box 10 prone to getting wet. This protects the electronic components from water without arranging the bent wall 35 along the entire cover-side peripheral wall 31.

The above embodiment may be changed as described below. The above embodiment and the following modifications can be combined as long as the combined modifications remain technically consistent with each other.

In the above embodiment, the first extension section 36 and the second extension section 37 are orthogonal to each other at the distal end 36b so that the bent wall 35 has a substantially L-shaped cross section. However, the shape can be changed in any manner.

In the above embodiment, the distal end 37a of the second extension section 37, which is the distal end of the bent wall 35, is located inward and downward from the upper end 16a of the inner wall 16. However, there is no limitation to such a configuration. Advantage (1) can be obtained as long as the bent wall 35 has a portion between the proximal end 36a and the distal end 37a that is located inward and downward from the upper end 16a of the inner wall 16.

In the above embodiment, the lower cover 23 and the case body 11 are separate components. However, the lower cover 23 and the case body 11 may be integrated with each other.

In the above embodiment, the upper cover 22 includes the first upper cover portion 30 and the second upper cover portion 40, which are separate components. However, the first upper cover portion 30 and the second upper cover portion 40 may be integrated with each other.

In the above embodiment, the bent wall 35 is arranged on part of the cover-side peripheral wall 31. However, the bent wall 35 may extend along the entire cover-side peripheral wall 31.

In the above embodiment, the cover-side peripheral wall 31 of the first upper cover portion 30 includes the inner wall 32 and the outer wall 33. However, the outer wall 33 may be omitted.

In the above embodiment, the second drain passage 42 is separate from the first drain passage 41. However, there is no limitation to such a configuration. For example, the passages may merge at an intermediate portion.

In the above embodiment, the second drain passage 42 is located at the outer side of the first drain passage 41. This positional relationship may be changed. Specifically, the second drain passage may be partially located at the inner side of the first drain passage.

The above embodiment includes the second drain passage 42, but the second drain passage 42 may be omitted.

In the above embodiment, the electrical junction box 10 is located in the proximity of a wall of the engine compartment. However, the electrical junction box 10 may be located at any position.

As shown in FIG. 4, the outer wall 17 of the case body 11 and the outer wall 33 of the upper cover 22 may include a positioning stopper. For example, the outer wall 33 may include a first step, and the outer wall 17 of the case body 11 may include a second step. The first step may include a first positioning surface that may be faced downward. The second step may include a second positioning surface that may be faced upward to support the first positioning surface of the outer wall 33 from below. The direct contact of the first step of the outer wall 33 of the upper cover 22 and the second step of the outer wall 17 of the case body 11 is advantageous for restricting the entry of water into the case body 11.

As shown in FIG. 4, the proximal end of the outer wall 33 of the upper cover 22 has a lower surface. The lower surface may be separated from an upper end of the outer wall 17 of the case body 11, for example, by a first predetermined distance. This forms a first space between the lower surface of the proximal end of the outer wall 33 of the upper cover 22 and the upper end of the outer wall 17 of the case body 11. The first space is one example of a first force-reduction means that is formed by the lower surface of the proximal end of the outer wall 33 of the upper cover 22 and the upper end of the outer wall 17 of the case body 11 to decrease the velocity and/or pressure (force) of water. This structure is advantageous for reducing the amount of water that advances beyond the upper end of the outer wall 17 and enters the case body 11.

As shown in FIG. 4, the proximal end 36a of the bent wall 35 has a lower surface, and the lower surface may be separated from the upper end 16a of the inner wall 16, for example, by a second predetermined distance. This forms a second space between the lower surface of the proximal end 36a of the bent wall 35 and the upper end 16a of the inner wall 16. The second space is one example of a second force-reduction means that is formed by the lower surface of the proximal end 36a of the bent wall 35 and the upper end 16a of the inner wall 16 to decrease the velocity and/or pressure (force) of water. This structure is advantageous for reducing the amount of water that advances beyond the upper end 16a of the inner wall 16 and enters the case body 11. Further, the velocity and/or force of the water has already been decreased by the first space before reaching the second space. The first space and second space cooperate to reduce the amount of water that advances beyond the upper end 16a of the inner wall 16 and enters the case body 11. The second predetermined distance and the first predetermined distance may be the same or different.

As shown in FIG. 4, the outer wall 33 and the inner wall 32 of the upper cover 22 form a first slot, or outer slot. The outer slot may be configured to cover the upper end of the outer wall 17, and for example, firmly hold the upper end of the outer wall 17.

As shown in FIG. 4, the bent wall 35 and the inner wall 32 form a second slot, or inner slot. The inner slot may be configured to cover the upper end of the inner wall 16, and for example, loosely accommodate the upper end of the inner wall 16 while provided with play. In the cross-sectional view of FIG. 4, the width of the inner slot, or the width of the second space, may be greater than the width of the outer slot, or the width of the first space.

As shown in FIG. 4, the upper end of the outer wall 17 of the case body 11 may be located at a height differing from that of the upper end 16a of the inner wall 16. In the example shown in FIG. 4, the upper end 16a of the inner wall 16 is located upward from the upper end of the outer wall 17. This structure is advantageous for reducing the amount of water that advances beyond the upper end 16a of the inner wall 16 and enters the case body 11.

In the above embodiment, the inner wall 16 and the outer wall 17 of the case body 11, the inner wall 32 and the outer wall 33 of the first upper cover portion 30, and the bent wall 35 are formed from an insulative synthetic resin. These hard members are placed next to one another to protect the electronic components from water. However, there is no limitation to such a structure.

Further, in the above embodiment, the inner wall 16 and the outer wall 17 of the case body 11, the inner wall 32 and the outer wall 33 of the first upper cover portion 30, and the bent wall 35 are formed from the same material. However, there is no limitation to such a structure.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electrical junction box, comprising:
a case body accommodating an electronic component; and
an upper cover, wherein
the case body includes a body-side peripheral wall, which has a closed form, and an upper opening, which is located at an upper side of the body-side peripheral wall and covered by the upper cover,
the upper cover includes a cover-side peripheral wall that has a closed form and is arranged on the body-side peripheral wall,
the body-side peripheral wall has a body-side double-wall including a first inner wall and an outer wall,
the cover-side peripheral wall includes
a first wall located between the first inner wall and the outer wall of the body-side double-wall and including an inner surface, and
a bent wall that extends inward and downward from the inner surface of the first wall,
the bent wall includes an inwardly extending first extension section including a proximal end connected to the inner surface of the first wall, a downwardly extending second extension section including a distal end, and a bent section connecting the first and second extension sections,
the bent wall is configured such that the first extension section is located above an upper end of the first inner wall of the body-side peripheral wall in a state that the upper cover covers the upper opening of the case body, and that a portion of the second extension section is located at an inner side of and lower than the upper end of the first inner wall of the body-side peripheral wall in the state that the upper cover covers the upper opening of the case body,
the case body includes a first drain passage that is located at an inner side of the first inner wall of the body-side double-wall and below the bent wall, in the state that the upper cover covers the upper opening of the case body,
the first drain passage is defined by a set of walls of the case body that includes the first inner wall of the body-side double-wall and a second inner wall located inside the first inner wall of the body-side double-wall and facing the first inner wall, and
the bent wall is configured such that an upper end of the second inner wall is located lower than the bent wall, in the state that the upper cover covers the upper opening of the case body.

2. The electrical junction box according to claim 1, wherein the case body includes a second drain passage located below the first wall, in the state that the upper cover covers the upper opening of the case body.

3. The electrical junction box according to claim 2, wherein the first drain passage and the second drain passage are separate passages configured to drain water.

4. The electrical junction box according to claim 2, wherein the second drain passage is located at an outer side of the first drain passage.

5. The electrical junction box according to claim 1, wherein
the cover-side peripheral wall further includes a second wall that is located outward from the first wall, and
the second wall and the first wall are arranged at two sides of the outer wall of the body-side double-wall.

6. The electrical junction box according to claim 1, wherein the bent wall is configured such that the distal end of the bent wall is located at an inner side of and lower than the upper end of the first inner wall of the body-side peripheral wall in the state that the upper cover covers the upper opening of the case body.

7. The electrical junction box according to claim 1, wherein the bent wall is arranged on part of the cover-side peripheral wall.

* * * * *